United States Patent [19]

Shigoku

[11] 4,341,450
[45] Jul. 27, 1982

[54] SELECTIVELY LOCKABLE CAMERA EXPOSURE FACTOR SETTING MECHANISM

[75] Inventor: Masaharu Shigoku, Yao, Japan

[73] Assignee: Minolta Camera Kabushiki Kaisha, Osaka, Japan

[21] Appl. No.: 260,206

[22] Filed: May 4, 1981

[30] Foreign Application Priority Data

May 12, 1980 [JP] Japan ............................. 55-65377[U]

[51] Int. Cl.³ .......................... G03B 9/02; G03B 17/00
[52] U.S. Cl. ...................................... 354/273; 354/289
[58] Field of Search ............... 350/252, 257; 354/195, 354/196, 226, 286, 270–274, 289

[56] References Cited

U.S. PATENT DOCUMENTS

| | | | |
|---|---|---|---|
| 3,059,558 | 10/1962 | Fahlenberg et al. | 354/196 |
| 3,196,768 | 7/1965 | Rentschler | 354/289 |
| 3,264,966 | 8/1966 | Starp | 354/289 |
| 3,774,994 | 11/1973 | Urano | 350/252 |
| 4,071,850 | 1/1978 | Okura | 354/289 X |
| 4,110,769 | 8/1978 | Schütz et al. | 354/195 |
| 4,229,074 | 10/1980 | Nonogaki | 350/429 |

FOREIGN PATENT DOCUMENTS

| | | | |
|---|---|---|---|
| 1132597 | 11/1956 | France | 354/273 |
| 1226190 | 2/1960 | France | 354/195 |
| 345241 | 4/1960 | Switzerland | 354/289 |

*Primary Examiner*—Donald A. Griffin
*Attorney, Agent, or Firm*—Watson, Cole, Grindle & Watson

[57] ABSTRACT

A camera exposure factor setting member, such as a diaphragm setting member, is movable in the vicinity of a fixed member, such as the lens barrel of an exchangeable lens. Either the fixed member or the exposure factor setting member is provided with a recess and the other one of them is provided with a lock member movable between a first position for permitting movement of the exposure factor setting member and a second position wherein the lock member engages a recess for preventing movement of the exposure factor setting member. The lock member is positively maintained at the first and second positions to prevent inadvertent movement therefrom.

11 Claims, 9 Drawing Figures

SELECTIVELY LOCKABLE CAMERA EXPOSURE FACTOR SETTING MECHANISM

FIELD OF THE INVENTION

The present invention relates to exposure factor setting mechanisms, such as diaphragm aperture setting mechanisms and shutter speed setting mechanisms for cameras, and in particular to manually operable locking mechanisms enabling the camera operator to lock such exposure factor mechanisms in selected positions.

BACKGROUND OF THE INVENTION

In prior art devices of the type to which the invention is directed, an exposure factor setting member is locked to prevent movement thereof from a specific set position. However, such prior art devices are arranged such that the locking mechanism automatically operates to always lock the exposure factor setting member in a specific position, regardless of the photographer's intention, when the exposure factor setting member is merely shifted to the specific position. For example, a camera capable of shutter speed priority automatic exposure control requires a diaphragm aperture setting member to be set at a specific position, such as the minimum diaphragm aperture position, when photographing in such an automatic exposure control mode. Thus, such known cameras have the disadvantage that correct exposure is unobtainable if the diaphragm aperture setting member should move from the specific set position, and it would be preferable therefore to lock the diaphragm aperture setting member in the specific set position.

In prior art diaphragm aperture setting mechanisms, the lock mechanism automatically operates to lock the diaphragm aperture setting member in the set specific position. In such diaphragm aperture setting mechanisms, however, to enable photography in any control mode other than automatic exposure control, e.g., photography with the diaphragm aperture setting member manually set to any desired position, the lock mechanism inevitably operates to lock the diaphragm aperture setting member when it reaches the specific position as it is being rotated for selecting the diaphragm aperture, thereby impeding the diaphragm aperture selecting operation. Consequently, prior art lockable diaphragm aperture setting mechanisms are disadvantageous in that a photographer has to operate the lock mechanism for releasing such abrupt locking, resulting in missing photographic opportunities.

SUMMARY OF THE INVENTION

Accordingly, the primary object of the present invention is to provide an improved exposure factor setting mechanism enabling an exposure factor setting member to be unmovably locked in a specific set position.

Another object of the present invention is to provide an exposure factor setting mechanism in which an exposure factor setting member is locked only when intended by the photographer unless otherwise unlocked.

Still another object of the present invention is to provide an exposure factor setting mechanism having a simple construction.

And yet another object of the invention is to provide click-stop mechanisms adapted for use with locking mechanisms to enable positive locking or unlocking of exposure factor setting members, and in particular diaphragm aperture setting mechanisms, at selected settings thereby preventing inadvertent movement thereof.

Still a further object of the present invention is to provide diaphragm aperture setting mechanisms enabling the selectable positive locking or unlocking thereof at one or more diaphragm aperture settings.

Yet another object of the invention is to provide positive locking and unlocking mechanisms adapted to function with diaphragm aperture setting mechanisms associated with camera exchangeable lenses.

And still yet another object of the invention is to provide improved click-stop mechanisms adapted for use with locking and unlocking mechanisms adapted to function with camera exposure factor setting members, such as for example diaphragm aperture setting mechanisms, thereby affording simple and inexpensive means of enabling the positive locking or unlocking at selected settings of the camera exposure factor setting members.

A camera exposure factor setting member, for example a diaphragm setting member on an exchangeable lens, is movable adjacent a fixed member, for example the lens barrel of the aforesaid exchangeable lens. Either the fixed member or the exposure factor setting member has a recess and the other one of the fixed member or the exposure factor setting member includes a lock member movable between respective first and second positions. In the first position, movement of the exposure factor setting member is permitted, whereas in the second position the lock member engages the recess for preventing movement of the exposure factor setting member. The lock member is positively maintained at the first and second positions to prevent inadvertent movement therefrom.

In accordance with one embodiment of the invention, a guide member, mounted on a fixed member of an exchangeable lens has a shelf formed thereon with a notch containing a projecting locking tab and a hole affording flexibility in the region of the shelf adjacent the locking tab. A manually operable lock member has a groove adapted to receive the guide notch and first and second recessions formed therein to respectively engage the projecting locking tab of the guide member. A knurled manual operating portion of the lock member enables the camera operator to move the lock member between first and second positions respectively formed by engagement of the locking tab with the first and second recessions. In the first position, the lock member is positively retained such that a locking projection thereon is out of engagement with at least one engagement recess formed in the diaphragm aperture setting mechanism of the exchangeable lens. In the second position, the locking projection projects from the lock member to engage a recess in the diaphragm aperture setting mechanism at a selected position thereof. An indicating mark, obscured from the view of the camera operator with the lock member in the first position, is unshielded by movement of the lock member into the second position, thereby indicating that the diaphragm aperture setting mechanism is positively locked at the selected position.

In a modified embodiment, the lock member and engagement recess are reversed such that the lock member is formed on the diaphragm aperture setting mechanism and the engagement recess is formed in the lens barrel of the exchangeable lens. The locking arrangement can be modified to incorporate a number of lockable positions of the exposure factor setting mechanism, such as the diaphragm aperture setting mechanism of an exchangeable lens.

In another embodiment of the invention, the locking mechanism is hidden, so as not to impair the aesthetic design of the exposure factor setting mechanism, such as the diaphragm setting mechanism of an exchangeable lens.

The invention also contemplates a number of click-stop mechanisms adapted for use with the locking mechanism so as to positively retain the locking mechanism at either the first or the second position as defined above.

BRIEF DESCRIPTION OF THE DRAWINGS

The above and other objects, advantages, features, and applications of the invention will become more apparent with the following description of preferred embodiments representing the best mode of carrying out the invention when considered in conjunction with the accompanying drawings in which.

DETAILED DESCRIPTION OF THE PREFERRED EMBODIMENTS

Figure 1:
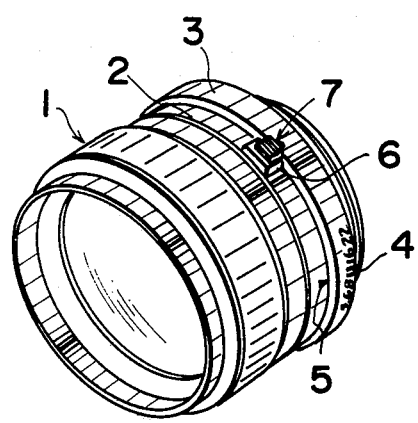
FIG. 1 is a perspective view of a first embodiment of an exposure factor locking mechanism of the present invention.
Figure 2:
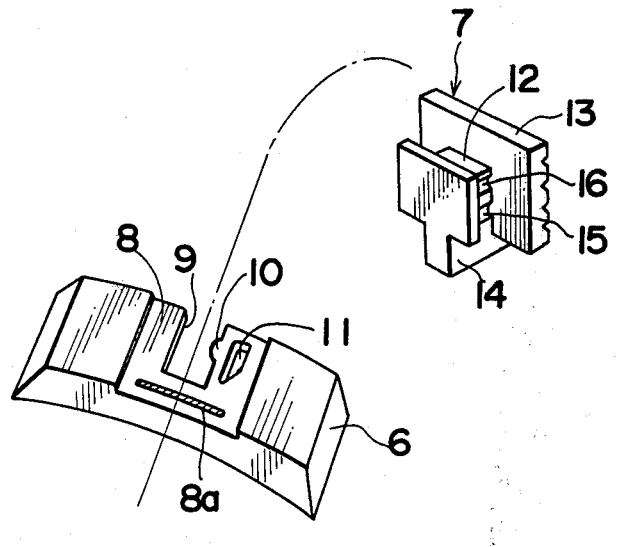
FIG. 2 is an exploded view showing only the essential parts of the embodiment shown in FIG. 1 with the locking member rotated ninety degrees from its normal operating position.
Figure 3:
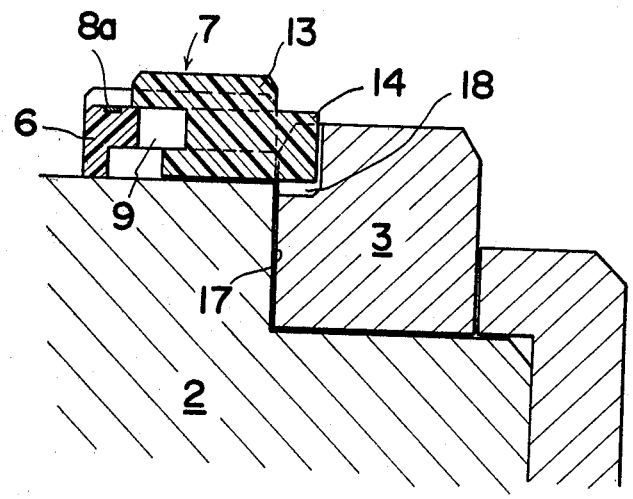
FIG. 3 is a cross-sectional view showing only the essential parts of the embodiment shown in FIG. 1.

With reference to FIGS. 1 through 3 which show a first embodiment of the present invention, interchangeable lens 1 is adapted to be detachably mounted on a camera body (not shown), and diaphragm aperture setting member 3 is provided adjacent to fixed barrel 2 and is rotatable through a predetermined angle about the exchangeable lens optical axis by external manual operation. Aperture scale 4 is carried by aperture setting member 3, and fixed index 5 is provided on fixed barrel 2 to indicate a preset aperture value in cooperation with scale 4.

Interchangeable lens 1 is arranged such that it is detachably mountable on a camera (in a manner known to those of ordinary skill in the camera art) and enabling the lens diaphragm aperture to be automatically controllable to any desired size, such that proper exposure is possible according to a manually set shutter speed, e.g., photographic exposure according to shutter-priority automatic exposure control. When the camera is set to an automatic exposure control mode, it is necessary for the diaphragm aperture setting member to be set to the minimum aperture position in order to effect automatic aperture adjustment. In the present embodiment, for example, a maximum f-number "22" indicating the minimum aperture value of an exemplary exchangeable lens is indicated by a different color than that of the other f-numbers (e.g., green vs white) to show the position that should be selected when automatic exposure control is in effect.

Guide member 6 is provided on fixed barrel 2, and lock member 7 is supported and guided by guide member 6, both members preferably being molded from plastic. As shown in FIGS. 2 and 3, integrally formed on guide member 6 is shelf 8 having guiding notch 9 formed with an opening facing aperture setting member 3. Furthermore, locking tab 10 is provided on the side wall of notch 9, and hole 11 is formed nearby such that it is elastically and easily transformable in the direction in which locking tab 10 is retracted when a force is applied thereto. Groove 12 is formed on lock member 7 with a shape engageable with notch 9 and is slidably supported and guided by notch 9 engaging groove 12. Manual operating portion 13 is preferably integrally molded to slide lock member 7 along with engaging projection 14. First and second recessions 15 and 16 engageable with locking tab 10 of guide member 6 are formed in groove 12 of lock member 7. When lock member 7 is shifted such that locking tab 10 is received in first recession 15, locking projection 14 is positioned in a non-projecting relationship from end surface 17 of guide member 6, and extends from end surface 17 of guide member 6 only when lock member 7 is shifted to receive locking tab 10 in second recession 16. Indication mark 8a is provided to indicate that aperture setting member 3 is locked and is colored (e.g. green) to be readily noticeable by the camera operator. Only when lock member 7 is shifted to receive locking tab 10 into second recession 16, is indication mark 8a visible, but is covered or shielded by manual operating member 13 at all other positions thereof.

As illustrated in FIG. 3, aperture setting member 3 is provided with engagement recess 18 formed facing locking projection 14 of lock member 7 when aperture setting member 3 is set to the minimum aperture position, i.e., when it is shifted to bring the maximum f-number "22" of aperture scale 4 into registration with fixed index 5. Engagement recess 18 is formed with a width almost equal to that of engaging projection 14, thereby forming a press fit with engaging projection 14 within engagement recess 18. Thus, aperture setting member 3 is prevented from rotating when engaging projection 14 is manually moved into engagement recess 18 by the camera operator.

The operation of the above construction is as follows. First, when the manual exposure control mode is selected, lock member 7 is capable of being shifted away from aperture setting member 3. With lock member 7 shifted away from aperture setting member 3, locking tab 10 on guide member 6 is shifted into first recession 15, thereby causing lock member 7 to be retained such that locking projection 14 is drawn out of engagement recess 18 formed on aperture setting member 3. Under this condition, even if aperture setting member 3 is rotated to bring the maximum f-number into registration with fixed index 5, locking projection 14 of lock member 7 is in a retracted position, whereby aperture setting member 3 is not locked therein and is freely rotatable. Therefore, the above-mentioned disadvantage of the prior art relating to the impediment of the aperture selection is obviated by the present invention.

When the shutter speed-priority automatic exposure control mode is selected, aperture setting member 3 is manually rotated to bring the maximum f-number "22" into registration with fixed index 5 after the automatic exposure control mode has been selected. Since engagement recess 18 is positioned to face lock member 7 under this condition, locking projection 14 of lock member 7 is capable of being engaged with engagement recess 18 by pressing lock member 7 towards aperture setting member 3. The rotation of aperture setting member 3 is checked when locking projection 14 of lock member 7 is press fit into engagement recess 18, whereby aperture setting member 3 is not movable from the minimum aperture position, such as might inadvertently occur without being noticed by the photographer in prior art apparatus. It should be noted that locking tab 10 on guide member 6 is pushed out of first recession 15 when lock member 7 is pressed and moved in the above manner to be fitted into second recession 16 to secure lock member 7, and in particular locking projection 14 into a projected locked position. This ensures that lock member 7 is secured in the projected locking position unless it is manually operated again. Furthermore, the fact that aperture setting member 3 is locked is observable by the photographer when indication mark 8a becomes visible.

Figure 4:
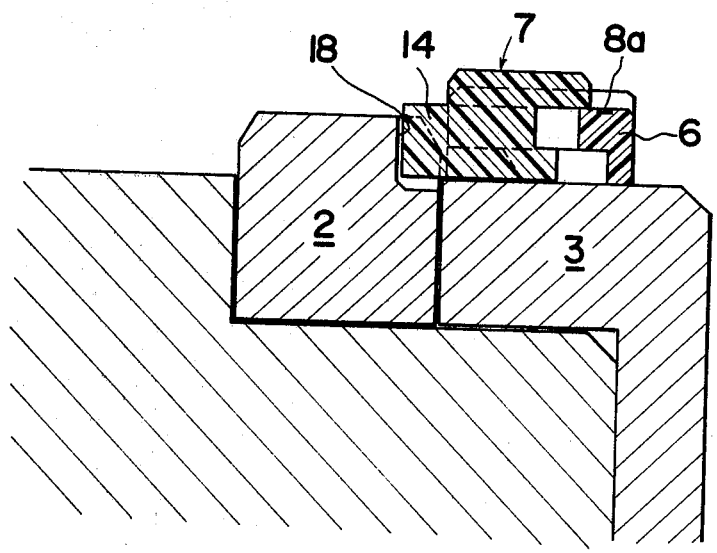
FIG. 4 is a cross-sectional view showing only the essential parts of a modification of the embodiment of FIGS. 1-3.

In accordance with the above embodiment, a locking member is provided on a fixed barrel of an exchangeable lens, and an engagement recess is provided in an aperture setting member. However, a reversal of the above locking components is also practical, that is, lock member 7 can be provided on aperture setting member 3 and engagement recess 18 formed on fixed barrel 2, as shown in FIG. 4 in which the components are numbered identically to that of the embodiment of FIGS. 1 to 3. Because the modified embodiment of FIG. 4 operates in the same manner as that of the previously described embodiment, no further description of the modified embodiment is necessary.

Figure 5:
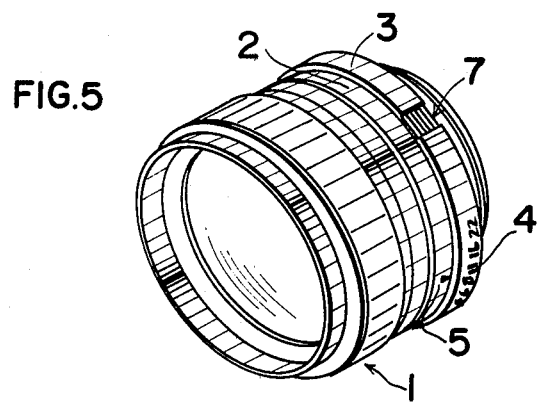
FIG. 5 is a perspective view of an exposure factor locking mechanism representing a second embodiment of the present invention.
Figure 6:
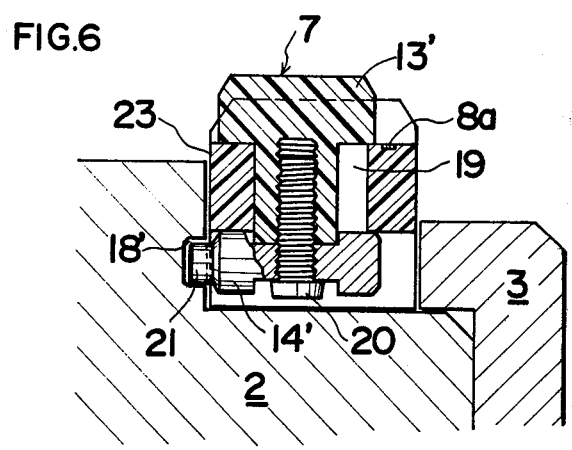
FIG. 6 is a cross-sectional view showing only the essential parts of the second embodiment shown in FIG. 5.

FIGS. 5 and 6 show a second embodiment of a selectively lockable camera exposure factor mechanism in accordance with the present invention. In the above-described embodiment, and modification thereof, engagement recess 18 is notch-shaped and is externally exposed. In accordance with the second embodiment of FIGS. 5 and 6, however, an engagement recess is formed at an unexposed position so as not to impair the aesthetic design appearance of the interchangeable lens. The same reference numbers are used for corresponding members with respect to the above embodiments, and a further description thereof is omitted. Lock member 7 consists of manual operating member 13' passing through circumferentially extending guide groove 19 of aperture setting member 3 and locking member 14' connected to manual operating member 13' through screw 20. When manual operating member 13' is shifted towards fixed barrel 2, as shown in FIG. 6, end portion 21 projects from end surface 23. However, when manual operating member 13' is shifted towards aperture setting member 3, locking end 21 is retracted within end surface 23. Engagement recess 18' in fixed barrel 2 receives locking end 21 of locking member 14' when aperture setting member 3 is set to the minimum aperture position.

It is to be noted that manual operating member 13' and aperture setting member 3 are provided with locking tab 10 and first and second recessions 15 and 16, respectively, as shown in the first embodiment of FIGS. 1-3 (although the illustration thereof is omitted in FIG. 6) and these components are arranged such that lock member 7 is movable between two positions, i.e., a position where locking end 21 is projected away from aperture setting member 3 into engagement recess 18' and a position where it is retracted toward aperture setting member 3 and not received in engagement recess 18'.

Locking member 14' is attached to manual operating member 13' by screw 20 such that lock member 7 may be manually operated in the same manner as described above with respect to the first embodiment of FIGS. 1-3 to lock aperture setting member 3 at the minimum aperture position, or alternatively to release the lock.

Figure 7:
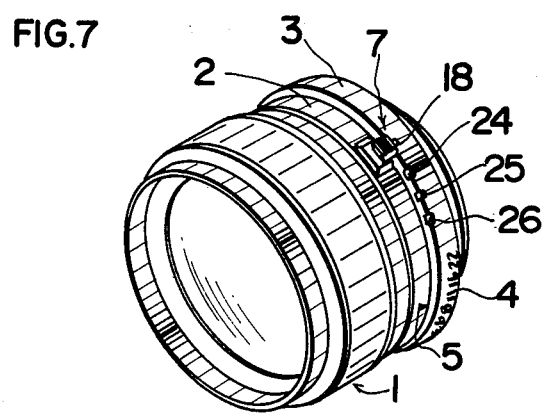
FIG. 7 is a perspective view of a third exposure factor locking mechanism embodiment of the present invention.

Moreover, with the embodiments described above, aperture setting member 3 is locked in a non-rotating condition only at one set position. However, if necessary, aperture setting member 3 may be locked at a number of set positions. FIG. 7 shows such an embodiment, which is a modification of the first embodiment shown in FIGS. 1 through 3. Specifically, aperture setting member 3 is, for example, provided with second, third and fourth engagement recesses 24, 25 and 26 in addition to engagement recess 18 as previously described. For example, second engagement recess 24 is disposed in a position confronting lock member 7 when aperture setting member 3 is shifted to bring f-number "11" into registration with fixed index 5. Similarly, third and fourth engaged portions 25 and 26 are respectively formed to have correspondence with f-numbers "8" and "4", respectively. It is apparent that additional engagement recesses can be formed in aperture setting member 3 as desired. Moreover, as in the modified embodiment of FIG. 4, the components can be reversed so that engagement recesses 18, 24, 25 and 26 are formed in fixed lens barrel 2 instead of aperture setting member 3.

Such arrangements make it possible to lock aperture setting member 3 at any of the intermediate aperture positions by manual movement of lock member 7. Therefore, for flash photography using an automatic electronic flash device, it is possible to maintain a selected intermediate aperture commensurate with the diaphragm aperture information input to the automatic flash device without the possibility of an inadvertent change of the aperture setting during photography.

It should be understood that lock member 7 may be provided on fixed barrel 2 so that the lock member can be used as an index to position a demountable interchangeable lens, or by arranging lock member 7 at a position facing or confronting aperture scale 4 for use as a fixed index to indicate a preset aperture.

In the above embodiments, an arrangement comprising locking tab 10 and first and second recessions 15 and 16 are used as a click-stop mechanism to prevent lock member 7 from freely moving from a set position when lock member 7 is set to either a projecting position for impeding the shift of an aperture setting member, or a retracted position for permitting the free movement thereof. However, other arrangements of click-stop mechanisms are also employable with the present invention.

Figure 8:
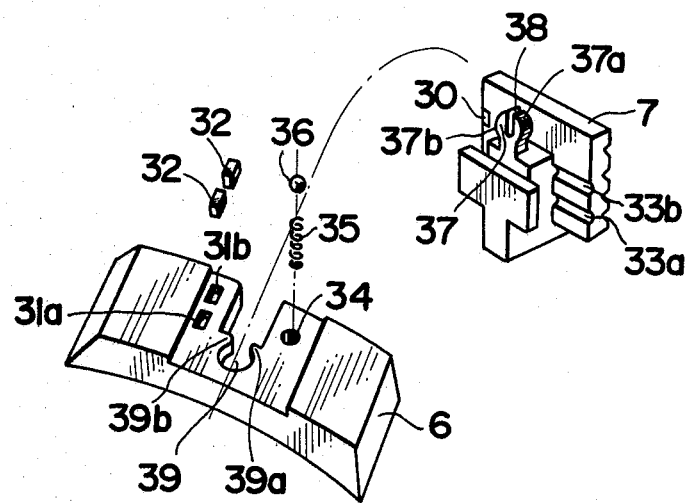
FIGS. 8 and 9 are perspective views showing respective exemplary modifications of click-stop mechanisms usable with the exposure factor locking mechanisms of the present invention.
Figure 9:
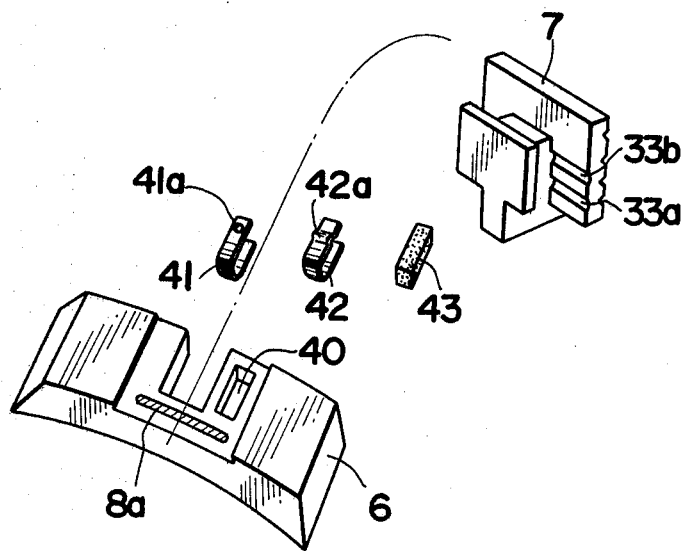

FIGS. 8 and 9 show exemplary preferred modifications of such click-stop mechanisms. A number of click-stop mechanisms are shown in one Figure for purposes of simplifying the following description. It is to be understood that in the present invention, however, only one of the click-stop mechanisms need be employed.

Specifically, the modifications of a click-stop mechanism are as follows:

(1) One metal piece 30 is provided on lock member 7, and two holes 31a and 31b with permanent magnets 32 adapted to be embedded therein are provided in guide member 6 (FIG. 8).

(2) Two grooves 33a and 33b are formed on lock member 7 and hole 34 is formed in guide member 6. Embedded in hole 34 is click-ball 36 which is always biased by spring 35 to project click-ball 36 out of hole 34 (FIG. 8).

(3) Disc-shaped projection 37 with slit 38 formed thereon is provided on lock member 7 so that it projects along the direction of movement thereof. Provided on guide member 6 is notch 39 shaped to press-fittingly engage disc-shaped projection 37 (FIG. 8). In this case, it is preferable that the interlockable members are molded of a material having a certain elasticity, e.g., plastic, for easy engagement and dis-engagement of disc-shaped projection 37. With this arrangement, lock member 7 is held in a projected or retracted position in response to the respective alternative engagement of projections 39a and 39b forming the entrance of notch 39 with curved portions 37a and 37b formed at the tip of projection 37, and at the root thereof.

(4) Grooves 33a and 33b are formed on lock member 7, and hole 40 is formed in guide member 6, with leaf spring 41 or 42 having respective projection 41a or 42a inserted therein (FIG. 9).

(5) Elastic frictional member (e.g., made of rubber) 43 is embedded in hole 40 provided in guide member 6, with the top portion thereof projecting slightly from the hole (FIG. 9). In this case, grooves 33a and 33b on lock member 7 may be omitted. With this arrangement, lock member 7 is locked not only in the projected and retracted positions, but also in any intermediate position between the two positions, thereby eliminating the free movement of lock member 7 therefrom.

It should be understood that although the above embodiments have described only the aperture setting mechanisms, the present invention is also applicable to shutter speed setting members and film sensitivity setting members.

With the exposure factor setting mechanism according to the present invention, an engagement recess is provided on either a fixed member or an exposure factor setting member, and a lock member accessible to the engagement recess is provided on the other member, whereby the lock member is manually operated to alternatively set it to a position where it engages the engagement recess or it disengages therefrom. This makes it possible not only to lock the exposure factor setting member in a specific position but also to leave it unlocked to thereby allow free movement within a range including the specific lockable position. Consequently, as compared with prior art mechanisms in which an exposure factor setting member is always locked at a specific position, the exposure factor selecting operation, e.g., the aperture selecting operation in accordance with the invention, is never impeded during the operation thereof, thereby enabling prompt determination of exposure possible.

It is my intention that the present invention not be limited to the embodiments specifically described, but that it include all such modifications and variations that would be obvious to those skilled in this art. The scope of my invention should be determined by the equivalents of the various terms as recited in the following annexed claims.

What is claimed is:

1. A camera exposure factor setting mechanism comprising:
   a fixed member;
   an exposure factor setting member adjacent to said fixed member and movable with respect thereto for setting an exposure factor;
   a recess formed in either said fixed member or said exposure factor setting member;
   a lock member provided on the other of said fixed member or said exposure factor setting member, said lock member being movable between a first position allowing movement of said exposure factor setting member and a second position wherein said lock member engages said recess for preventing movement of said exposure factor setting member; and
   visible indication means including a distinguishably colored portion for alternately enabling said colored portion externally visible and invisible depending on the position of said lock member.

2. A camera exposure factor setting mechanism as claimed in claim 1, wherein said other of said fixed member or exposure factor setting member includes a guide portion for supporting said lock member, and wherein said distinguishable colored portion is provided adjacent said guide portion within the area shielded by said lock member positioned in said first position and visibly exposed with said lock member positioned at said second position.

3. A camera diaphragm preset mechanism for an interchangeable lens comprising:
   a fixed member;
   a diaphragm setting member rotatable about the optical axis of said interchangeable lens;
   a recess being formed in either said fixed member or said diaphragm setting member;
   a lock member supported by the other of said fixed member or said diaphragm setting member, said lock member being movable between a first position for disengagement from said recess and a second position for engagement with said recess for preventing said diaphragm setting member from rotating;
   the other of said fixed member or said diaphragm setting member includes a guide for slidably supporting said lock member; and
   means for positively maintaining said lock member at said first and second positions and including a locking projection provided on either said lock member or said guide, and the other of said lock member or said guide is provided with recesses for receiving said locking projection.

4. A camera diaphragm preset mechanism as claimed in claim 3, wherein said locking projection is provided on said guide and said lock member is provided with said recesses, and said guide includes a hole adjacent to said locking projection for facilitating engagement of said locking projection and recesses.

5. A camera diaphragm preset mechanism as claimed in claim 3, wherein said guide is provided with a distinguishable portion within the area shielded by said lock member positioned in said first position and exposed with said lock member positioned at said second position.

6. A camera exposure factor setting mechanism comprising:
- a fixed member;
- an exposure factor setting member adjacent to said fixed member and movable with respect thereto for setting an exposure factor;
- a recess formed in either said fixed member or said exposure factor setting member;
- a lock member supported by a guide provided on the other of said fixed member or said exposure factor setting member, said lock member being movable between a first position allowing movement of said exposure factor setting member and a second position wherein said lock member engages said recess for preventing movement of said exposure factor setting member; and
- means for positively maintaining said lock member at said first and second positions, and including a locking projection means provided on either said lock member or said guide, the other of said lock member or said guide being provided with recesses for receiving said locking projection means.

7. A camera exposure factor setting mechanism as claimed in claim 6, wherein said locking projection means includes a locking projection formed as a part of said guide.

8. A camera exposure factor setting mechanism as claimed in claim 7, wherein said guide has a hole adjacent to said locking projection for facilitating engagement thereof with said recesses.

9. A camera exposure factor setting mechanism as claimed in claim 6, wherein said locking projection means includes a resiliently supported click-member provided on said guide.

10. A camera exposure factor setting mechanism as claimed in claim 6, wherein said locking projection includes a leaf spring having a projection engageable into said recesses.

11. A camera exposure factor setting mechanism comprising:
- a fixed member;
- an exposure factor setting member adjacent to said fixed member and movable with respect thereto for setting an exposure factor;
- a recess formed in either said fixed member or said exposure factor setting member;
- a lock member supported by a guide provided on the other of said fixed member or said exposure factor setting member, said lock member being movable between a first position allowing movement of said exposure factor setting member and a second position wherein said lock member engages said recess for preventing movement of said exposure factor setting member; and
- means for positively maintaining said lock member at said first and second positions, said means including a permanent magnet provided on either or both said lock member or guide and a metal piece provided on the other of said lock member or guide.

* * * * *